Dec. 8, 1959  R. PABST ET AL  2,915,843
SIGN
Filed Feb. 13, 1956
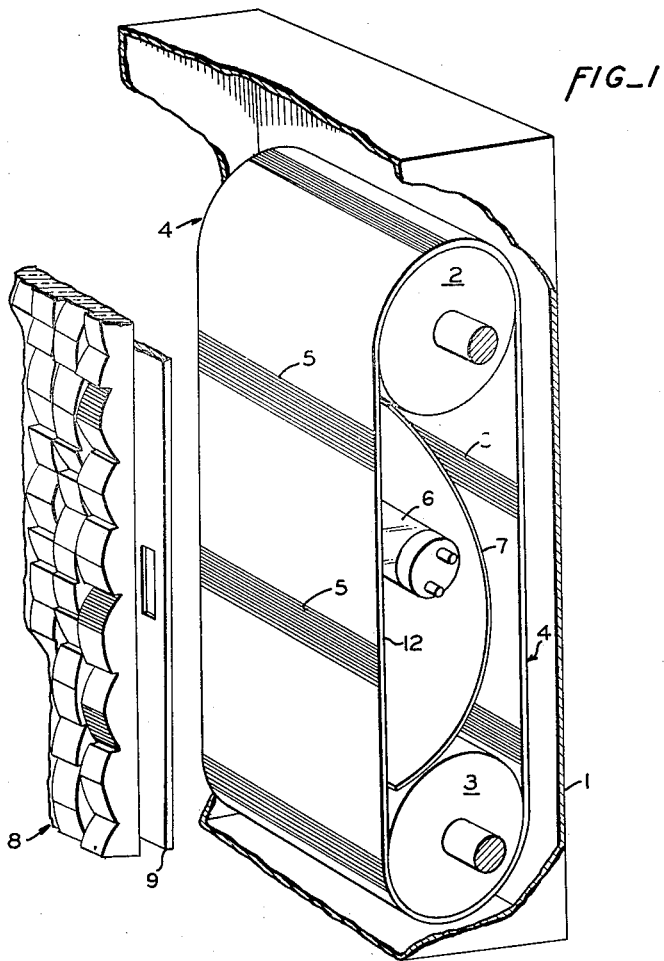
FIG_1
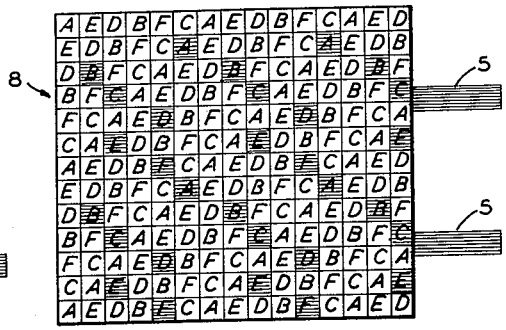
FIG_3
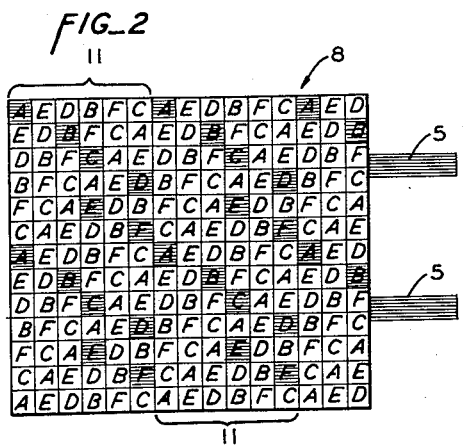
FIG_2
INVENTORS
RUDOLF PABST
WILLIAM E. THOMAS
BY
ATTORNEYS

United States Patent Office 2,915,843
Patented Dec. 8, 1959

2,915,843

SIGN

Rudolf Pabst, San Mateo, and William E. Thomas, San Francisco, Calif., assignors to Prism Signs Inc., San Mateo, Calif., a corporation of California Application February 13, 1956, Serial No. 565,094

1 Claim. (Cl. 40—130)

This invention relates to and in general has for its object the provision of an animated sign.

More specifically, the object of this invention is the provision of an animated sign comprising: an optical screen provided on one face thereof with a plurality of rows and columns of dissimilar lens segments of identical radii of curvature and having a common focal plane, a stenciled sign screen covering one side of said optical screen, a source of light reciprocating in a common focal plane, and means for periodically interrupting said source of light or for coloring the light emanating therefrom.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

As is well known, all of the rays of light passing through a plano-convex spherical lens in parallelism with the optical axis thereof, converge respectively to a point lying on or intersecting the optical axis of the lens and lying on its focal plane. As a matter of fact, each portion or segment of such a lens functions in this manner, for all such segments have identical radii of curvature and all of them have a common optical axis, and therefore, a common focal plane.

Similarly, each portion of a plano-convex cylindrical lens focuses light passing through it on a common focal line lying on the focal plane of the lens. Such a lens, however, instead of having an optical axis may be considered as having an optical axial plane, the line of intersection of this plane with the focal plane being the focal line of the lens. If the curvature of the lens is from top to bottom, the optical axial plane of the lens will be horizontal.

If a spherical lens of the character referred to is actually cut into rows and columns of segments parallel with its axis and any such segment (other than the segment containing the optical axis of the lens) is rotated about its longitudinal center line (not optical axis), its optical axis will have been angularly and laterally displaced so that it is no longer coaxial with the optical axis of the original lens. However, the focal point of the rotated segment will still lie on the focal plane of the original lens and will intersect the optical axis of the lens segment. A similar displacement of the focal point of a lens segment can be obtained by displacing it laterally from its original position.

If a cylindrical lens of the character referred to be cut into rows and columns of square lens segments and one of such lens be rotated through 90 degrees, its focal line will be correspondingly rotated through the same angle and will be vertical rather than horizontal, but will still lie on the focal plane of the lens. If the position of two dissimilar lens segments of any two rows of segments be interchanged, their focal lines will still lie on the common focal plane, but they will be vertically spaced from each other and from the focal line of the lens. It will therefore be seen that by resorting to this expedient, it is possible to rearrange the segments of a segmented lens in such an order that their focal points or focal lines are scattered over their common focal plane.

If in such a system a bundle of light rays is made to originate from each focal point or line and diverge towards its corresponding lens segment, each such bundle will pass through its corresponding lens segment and emerge therefrom as a parallel bundle of rays and the entire front face of the segmented lens will be brilliantly illuminated. By moving an opaque band in front of the focal plane to thereby progressively intercept each row of bundle of rays, the corresponding lens segments will be progressively blacked out in the order in which the focal points or lines of the lens segments occur in the focal plane. More specifically, various lens segments in various rows and columns would be first blacked out, and then various segments in various other rows and columns would be blacked out, etc., until the opaque band had completely traversed or scanned the focal plane. Thus a twinkling effect of an indiscriminate pattern would be produced on the front of the segmented lens.

If the opaque band be replaced by a color filter, the affected lens segments will appear colored rather than black.

By merely placing a stencil bearing some picture, symbol, indicia, etc. over the segmented lens, the device can be made to serve as an animated sign.

Referring to the drawings:

Fig. 1 is an isometric view of a sign embodying the objects of our invention.

Fig. 2 is a front elevation of the optical screen of Fig. 1, diagrammatically illustrating the effect thereon of an interrupted source of light located at the focal plane of its lens segments.

Fig. 3 is a view similar to Fig. 2, but wherein the source of light at the focal plane has been interrupted along the different rows of focal lines.

As illustrated in these various figures, the objects of our invention have been embodied in a sign comprising a generally rectangular casing 1. Journaled in the casing 1 is a pair of vertically spaced rolls 2 and 3, means not shown being provided for driving one of these rolls.

Reeved around the rolls 2 and 3 is a belt 4 conveniently made of a clear transparent plastic and provided with a plurality of spaced bands 5 of either an opaque material or of a colored, translucent material.

Mounted centrally within the confines of the belt 4 is a fluorescent lighting tube 6, and disposed rearwardly thereof is a reflector 7.

Extending across the front open face of the casing 4 is an optical screen 8, and mounted over one side of the screen is a sign stencil 9.

The optical screen 8 is made up of a plurality of contiguous, integral, and identical optical screen sections 11. Each screen section is formed, as above described, with a plurality of rows and columns of cylindrical lens segments A to F inclusive, of an identical radius and all having a common focal plane. Here it should be noted that the front reach 12 of the belt 4 preferably should be coplanar with the common focal plane of the lens segments A to F inclusive. If then as illustrated in Fig. 1, the cylindrical lens segments are curved from top to bottom parallel rays of light entering the front faces of the lens segments in a direction normal to the optical screen will converge on their common focal plane (the front reach 12 of the belt 4) in vertically spaced rows of horizontally disposed focal lines. Conversely, if light originating at the focal plane or passing therethrough retraces the above path, all of the lens segments will be brilliantly illuminated. If, however, the light passing through or originating at the focal plane is interrupted along one or more rows of focal lines, as happens when the belt 4 is rotated, then the corresponding lens segments will either be blacked out or colored, depending upon whether the bands 5 are opaque or transparent and colored. Furthermore, if the lens segments A' to F' are arranged as illustrated in Figs. 1, 2, and 3 in an order differing from the order in which they would normally occur in a cylindrical lens, the various focal lines of the lens segments in one row of lens segments will be vertically spaced. This is illustrated in Figs. 2 and 3, from which it will be seen that the bands 5, when located as shown in Fig. 2, serve to black out or color various lens segments throughout the entire are of the optical screen 8 (these particular segments being shaded), whereas when the bands 5 have moved to a different and lower position, a different pattern of blacked out or colored lens segments obtains. As a result of the progressive movement of the belt, a twinkling effect is therefore produced which appears to be indiscriminate, although actually it is repetitive. It is repetitive for any given position of the belt, for the optical screen 8 is made up of repetitive screen sections 11, and it is also repetitive in point of time depending upon the spacing of the bands 5, which of course is optional, as likewise is their width and number. The belt 4 of course can be reciprocated rather than continuously turned, and a reciprocating rack carrying a plurality of horizontally disposed, thin fluorescent lighting tubes disposed in the common focal plane of the lens segments A' to F' can be substituted for the belt 4, the tube 6, and the reflector 7, for the fundamental requirement is merely that there be some source of light rays located at or passing through the focal lines of the lens segments, plus some means for periodically and progressivelly inactivating said rays.

Instead of resorting to an optical screen made up of cylindrical lens segments arranged out of normal order, spherical lens segments arranged out of normal order can be used. Here each lens segment would have a common focal plane, but parallel light rays passing rearwardly through the front of the optical screen would converge on the focal plane in rows and columns of focal points rather than focal lines.

The basic requirement in so far as the optical screen sections 11 is concerned is that they be made up of lens segments either cylindrical or spherical, all having an identical radius of curvature, all having a common focal plane, all having focal lines or focal points located in said common focal plane, and said segments being so arranged out of their normal order that the focal lines or points of any given row of lens segments lie in various rows in the focal plane. Preferably, the high points of all of the lens segments should lie in a common plane normal to the axes or axial planes of the lens segments, and the rear flat face of the optical screen should be parallel with said normal plane. In such an arrangement, it will be seen that there will be a variation in slope (tangent) of various of the lens segments as measured with respect to a common reference plane, this being so because various of the lens segments represent dissimilar portions of a common or reference lens.

As a result of the structure above described, it is possible to obtain in a sign an apparently indiscriminate twinkling effect without the use of complicated commutating switches and without the use of a multiplicity of individual lights.

We claim:

A sign construction comprising an outer integral optical lens and display screen formed of light transmitting material, said screen comprising a plurality of contiguous and integral elements forming a plurality of adjacent rows, each element comprising an outwardly curved lens segment, all of said lens segments having identical radii of curvature and a common focal plane, the lens segments of a row having dissimilar lens curvatures with respect to the plane of the screen whereby the foci of said segments are displaced angularly and laterally of the direction of said rows, a source of light located to the rear of said screen, means disposed in the common focal plane of said lens segments between the light source and said screen for recurrently intercepting light applied from said source to the screen, said last means comprising a member formed of light transparent material extending in said focal plane, a plurality of discriminate light intercepting means carried by said member and extending in the direction of said rows, said light intercepting means being spaced in a direction laterally of said rows, and means for cyclically moving said member in a direction laterally of said rows whereby an indiscriminate twinkling effect is produced on the display screen.

References Cited in the file of this patent
UNITED STATES PATENTS

| | | |
|---|---|---|
| 592,631 | Hollander | Oct. 26, 1897 |
| 957,120 | Spiegel | May 3, 1910 |
| 1,219,731 | Hall | Mar. 20, 1917 |
| 1,296,246 | Whittemore | Mar. 4, 1919 |
| 2,061,393 | Christensen | Nov. 17, 1936 |
| 2,151,236 | Schwartz et al. | Mar. 21, 1939 |
| 2,271,196 | Kaszab | Jan. 27, 1942 |
| 2,371,172 | Hotchner | Mar. 13, 1945 |
| 2,419,216 | Hotchner | Apr. 22, 1947 |
| 2,432,896 | Hotchner | Dec. 16, 1947 |
| 2,706,930 | Jansen | Apr. 26, 1955 |
| 2,726,573 | Maloff | Dec. 13, 1955 |